Oct. 13, 1942.  G. M. MAGRUM  2,298,396

HYDRAULIC SHOCK ABSORBER VALVING ASSEMBLY

Filed May 9, 1941

Inventor
GERVASE M. MAGRUM.
by Charles D. Mills Attys.

Patented Oct. 13, 1942

2,298,396

UNITED STATES PATENT OFFICE 2,298,396

HYDRAULIC SHOCK ABSORBER VALVING ASSEMBLY

Gervase M. Magrum, Buffalo, N. Y., assignor, by mesne assignments, to Houdaille-Hershey Corporation, Detroit, Mich., a corporation of Michigan Application May 9, 1941, Serial No. 392,809

3 Claims. (Cl. 277—71)

My invention relates to hydraulic shock absorbers and particularly to improved valving assembly for controlling the flow of displaced hydraulic fluid.

My improved valving assembly is particularly useful in shock absorbers for controlling caster or shimmy movement of wheels, as for example, the caster wheel of a landing gear for aircraft. For control of such caster wheels it may be desirable that the shock absorber valving assembly should function for free flow of displaced fluid and little or no resistance to small, slow or gradual caster movements of the wheel, but should function quickly to impose maximum resistance to displace fluid flow to check sudden or abrupt castering movements and so prevent shimmying.

The important object of my invention is to provide simple valving assembly which will efficiently function to produce the desirable control referred to.

Figure 1:
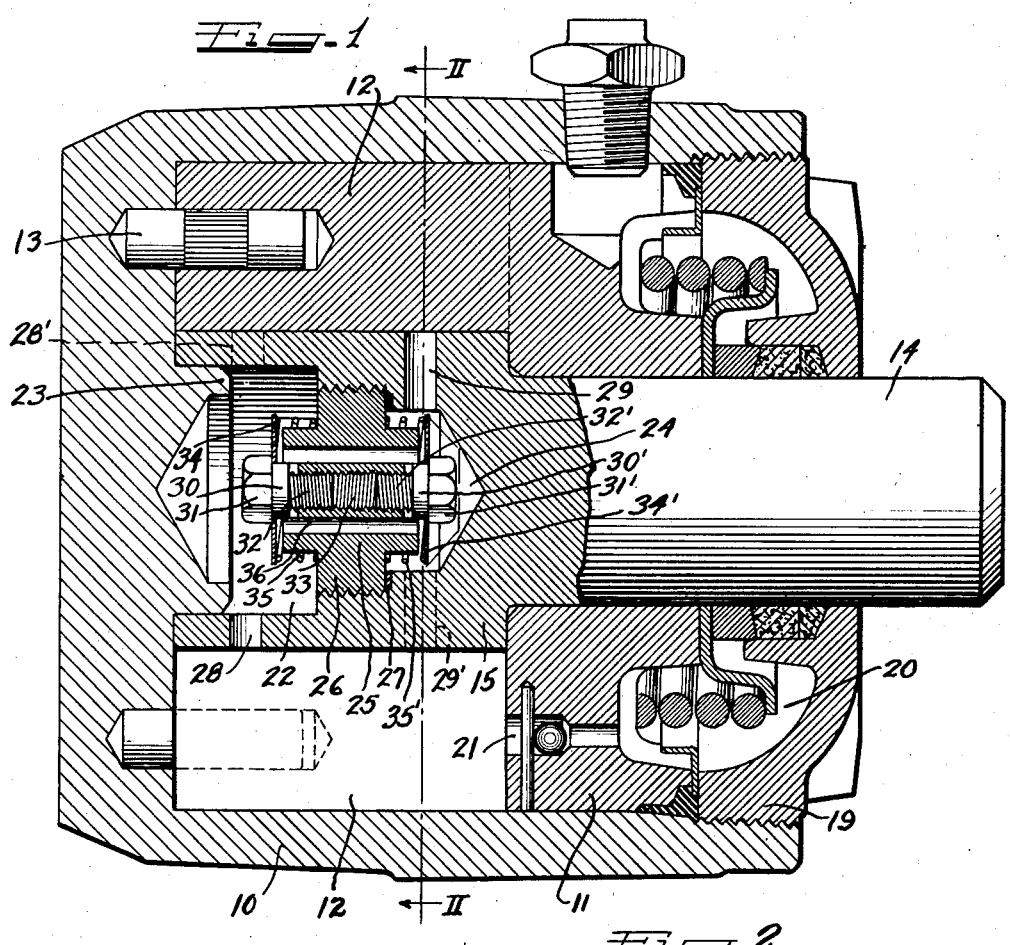
Figure 2:
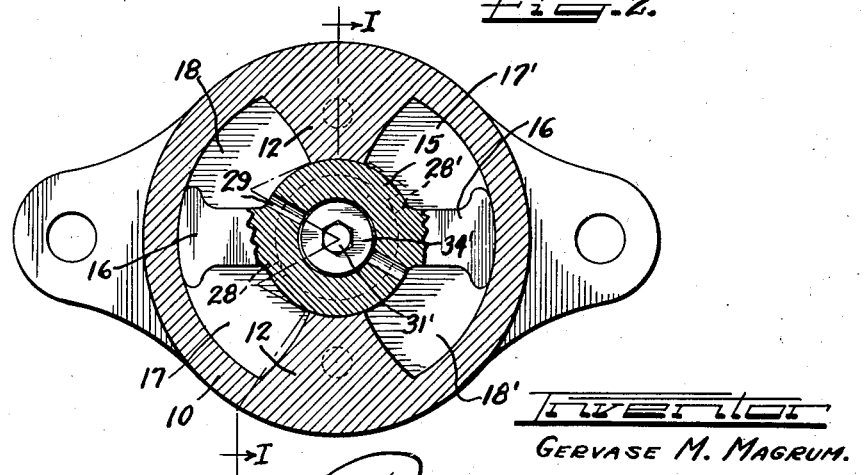

On the accompanying drawing I have shown valving structure embodying the various features of my invention. On the drawing Figure 1 is a vertical diametral sectional view on plane I—I of Figure 2 of a shock absorber in which my improved valving assembly is applied; and, Figure 2 is a section on plane II—II of Figure 1.

The shock absorber shown comprises the cup-shaped housing 10 receiving near its outer end the bearing wall 11 from which abutment walls 12 extend to the base of the housing, pins 13 holding the wall and abutments against rotational displacement in the housing. The bearing wall journals the piston shaft 14 extending from the cylindrical piston hub 15 between the abutments 12, the hub having vanes 16 which, with the abutments, define hydraulic working chambers 17, 17' and 18, 18'.

A closure member or cover 19 screws into the outer end of the housing 10 to axially hold the wall 11 and abutments 12 in place, the wall 11 and cover 19 having opposed recesses forming a reservoir 20 for hydraulic fluid which is fed to the working chambers through check valve controlled passageways 21, in a manner well known in the art. When the shock absorber is employed on a vehicle, the housing is usually secured to the vehicle body and the outer end of the piston shaft is connected by suitable levers with the vehicle axle so that upon relative movement between axle and body the piston structure will be oscillated within the housing to displace fluid in the working chambers. Where the shock absorber is employed on aircraft landing gear, the shock absorber housing may be mounted on the landing gear frame work and the piston shaft connected by suitable levers with the caster wheel assembly so that castering movement of the wheel will cause oscillation of the piston structure within the housing.

At its inner end the piston hub has the bore or chamber 22 into which extends a boss 23 on the housing base for affording additional bearing support for the piston structure. Outwardly from the bore 22 the piston hub has the bore 24 at the inner of which is mounted a valve seat member 25. This member may be secured in any suitable manner. As shown it has the circumferential flange 26 having threaded engagement with the piston hub to seat against a sealing gasket 27.

The chamber 22 is connected by passageways 28 and 28' with the hydraulic working chambers 17 and 17', respectively, while the bore or chamber 24 is connected by passageways 29 and 29' with the working chambers 18 and 18', respectively, the seat members being thus interposed between the two sets of passageways.

Extending from the opposite side of the seating member 26 at the axis thereof are inner and outer studs 30 and 30' having heads 31 and 31', respectively. The studs may be secured to the seating member in any suitable manner. As shown the studs have threaded ends 32 and 32', respectively, engaging in the threaded axial passageway 33 in the seating member.

Slidable on the stud 30 between its head 31 and the adjacent end of the seating member is a valve disc 34 which is normally held against the head by a spring 35 extending between the valve disc and the flange 26 of the seating member. On the stud 30' is a similar valve disc 34' normally held against the head 30' by a spring 35'. Extending through the seating member body are a number of passageways 36 which are normally open at their ends to the spaces between the valves and the ends of the seating member body.

Where the shock absorber is used for controlling the castering movement of the caster wheel on an aircraft landing gear, the valves 34 and 34' will be normally held equidistant from the ends of the seating member and the springs 35 and 35' would exert equal pressure for holding the valves in this open position. During gradual or slow castering movement of the caster wheel and corresponding slow oscillation of the shock absorber piston structure, the valves will remain open for full exposure of the passageways 36 and free flow therethrough of the displaced hydraulic fluid in either direction and little or no hydraulic resistance will be imposed on the castering movement. However, should the wheel tend to rapidly or abruptly swing or caster, the corresponding rapid movement of the piston structure will cause the displaced fluid to build up pressure against the outer side of the corresponding valve to shift this valve against the resistance of its spring against the corresponding end of the seating member to close the passageways 36 so that the shock absorber will then impose its maximum resistance to check the piston movement and the castering movement of the wheel and so prevent shimmying of the wheel. As soon as the wheel has thus been checked, the valves will be reopened for normal fluid flow between the working chambers. Thus, under normal or comparatively slow castering movements the valve springs will hold the valves open for free fluid flow while, under sudden or abnormal movements of the wheel and corresponding pressure beyond a predetermined amount, the pressure will close the springs to impose maximum hydraulic resistance to castering movement.

In some installations, as for example on automotive vehicles, it may be desirable to have the shock absorber exert greater hydraulic resistance to flow in one direction than in the other. For such operation, adjustment can readily be made by using different powered springs for the valve, or by adjusting the valve supporting studs for increasing or decreasing the distance between a valve and the seat member when the valve is open.

I have shown practical and efficient embodiment of the features of my invention but I do not desire to be limited to the exact construction, arrangement and operation shown and described as changes and modifications may be made without departing from the scope of the invention.

I claim as follows:

1. A valving assembly for controlling the displaced fluid in a hydraulic shock absorber, comprising a seat member interposed in the path of the fluid flow and having a flow passageway therethrough, said seat member having a threaded axial bore therethrough, studs having threaded inner ends engaging in the opposite ends of said threaded bore and having abutment heads at their outer ends, a valve disk on each stud movable between the stud head and the respective side of said seat member, a spring between each valve disk and the adjacent side of the seat member tending to hold the valve disk against the respective stud head for exposure of said seat member passageway to fluid flow under normal pressure, said valve disk being responsive to increased flow pressure against the outer sides thereof to be moved by the pressure toward the seat member to restrict the flow through the seat member passageway.

2. In a hydraulic shock absorber of the rotary type having a piston provided with a valve chamber interposed in the path of the displaced fluid flow, a valving assembly for controlling the displaced fluid flow comprising a seat member within the valve chamber having a passageway therethrough for the flow, said seat member having a threaded axial bore, studs having threaded inner ends for engaging in the respective ends of said threaded bore and each stud having an abutment head at its outer end, a valve disk mounted on each stud and movable thereon between the stud head and the respective end of the seat member for controlling the flow through the seat member passageway, a spring interposed between each valve disk and the respective end of the seat member tending to hold the valve disk against the head for exposure of the passageway for flow under normal pressure, said valve disks being responsive to abnormal pressure against the outer sides thereof to be moved by the pressure against the spring resistance toward the seat member to restrict the flow through said passageway.

3. A valving assembly for controlling the displaced fluid in a hydraulic shock absorber, comprising a seat member interposed in the path of the fluid flow and having a passageway therethrough for the flow, said seat member having a threaded axial bore therethrough, studs having threaded engagement at their inner ends in the respective ends of said bore and each stud terminating in an abutment head, a valve mounted on each stud for movement between the stud head and the respective end of said seat member, a spring for each valve for holding it under normal fluid flow pressure against the stud head to expose the seat member passageway for fluid flow under normal pressure, each valve being responsive to abnormal flow pressure against its outer side for movement thereof toward the seat member to restrict the flow through said passageway, the threaded engagement of said studs in said bore permitting independent adjustment thereof for the normal displacement of the respective valve away from the seat member.

GERVASE M. MAGRUM.